United States Patent
Kim et al.

(10) Patent No.: US 9,769,382 B2
(45) Date of Patent: Sep. 19, 2017

(54) METHOD FOR ENHANCING NOISE CHARACTERISTICS OF IMAGE AND ELECTRONIC DEVICE THEREOF

(71) Applicant: Samsung Electronics Co., Ltd., Suwon-si (KR)

(72) Inventors: Dong-Soo Kim, Suwon-si (KR); Hwa-Yong Kang, Suwon-si (KR); Young-Kwon Yoon, Seoul (KR); Jian Chang, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 4 days.

(21) Appl. No.: 14/854,598

(22) Filed: Sep. 15, 2015

(65) Prior Publication Data

US 2016/0080653 A1 Mar. 17, 2016

(30) Foreign Application Priority Data

Sep. 15, 2014 (KR) ........................ 10-2014-0121704

(51) Int. Cl.
| | |
|---|---|
| *H04N 5/217* | (2011.01) |
| *H04N 5/262* | (2006.01) |
| *H04N 5/228* | (2006.01) |
| *H04N 5/232* | (2006.01) |
| *H04N 5/265* | (2006.01) |
| *G06T 3/40* | (2006.01) |
| *G06T 5/00* | (2006.01) |
| *G06T 5/50* | (2006.01) |
| *H04N 5/235* | (2006.01) |
| *H04N 5/345* | (2011.01) |
| *H04N 5/347* | (2011.01) |
| *H04N 9/04* | (2006.01) |

(52) U.S. Cl.
CPC ....... *H04N 5/23245* (2013.01); *G06T 3/4053* (2013.01); *G06T 5/002* (2013.01); *G06T 5/50* (2013.01); *H04N 5/2351* (2013.01); *H04N 5/23232* (2013.01); *H04N 5/265* (2013.01); *H04N 5/347* (2013.01); *H04N 5/3458* (2013.01); *H04N 9/045* (2013.01); *G06T 2200/28* (2013.01); *G06T 2207/20192* (2013.01); *G06T 2207/20221* (2013.01)

(58) Field of Classification Search
CPC .... H04N 5/23245; H04N 5/235; H04N 5/265; H04N 5/357; G06T 3/4053; G06T 7/0085; G06T 2200/28; G06T 2207/20212; G06T 2207/20221
USPC ... 348/208.1, 220.1, 221.1, 229.1, 239, 362; 382/274, 275, 313
See application file for complete search history.

(56) References Cited

U.S. PATENT DOCUMENTS

| | | | |
|---|---|---|---|
| 8,830,360 B1 * | 9/2014 | Burt | H04N 5/21 348/241 |
| 2008/0296639 A1 | 12/2008 | O | |
| 2009/0196518 A1 * | 8/2009 | Stein | H04N 19/159 382/248 |

(Continued)

*Primary Examiner* — Lin Ye
*Assistant Examiner* — Euel Cowan
(74) *Attorney, Agent, or Firm* — McAndrews, Held & Malloy, Ltd.

(57) ABSTRACT

An electronic device is provided. The electronic device includes at least one image sensor, and a processor for generating a plurality of images having different noise characteristics through the at least one image sensor, and combining the plurality of images.

20 Claims, 12 Drawing Sheets

(56) References Cited

U.S. PATENT DOCUMENTS

| | | | |
|---|---|---|---|
| 2010/0066858 A1* | 3/2010 | Asoma | H04N 5/232 348/229.1 |
| 2010/0220222 A1* | 9/2010 | Naito | H04N 5/217 348/241 |
| 2010/0220223 A1* | 9/2010 | Tsuruoka | G06T 5/002 348/242 |
| 2011/0052095 A1* | 3/2011 | Deever | G06T 3/4076 382/300 |
| 2014/0153820 A1* | 6/2014 | Lee | G06T 5/007 382/162 |
| 2015/0049215 A1* | 2/2015 | Kuang | H04N 5/2355 348/231.6 |
| 2015/0341535 A1* | 11/2015 | Forutanpour | H04N 5/23293 348/222.1 |

* cited by examiner

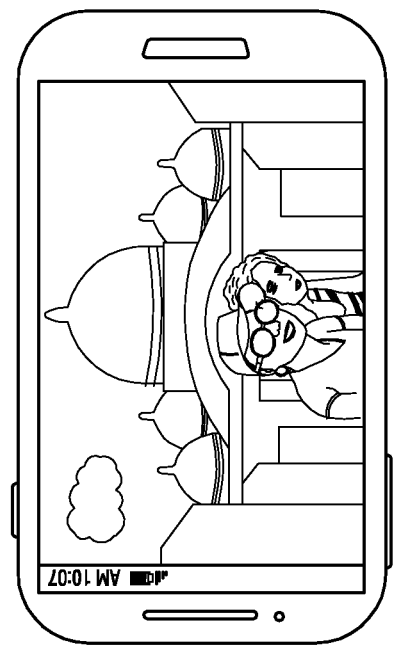
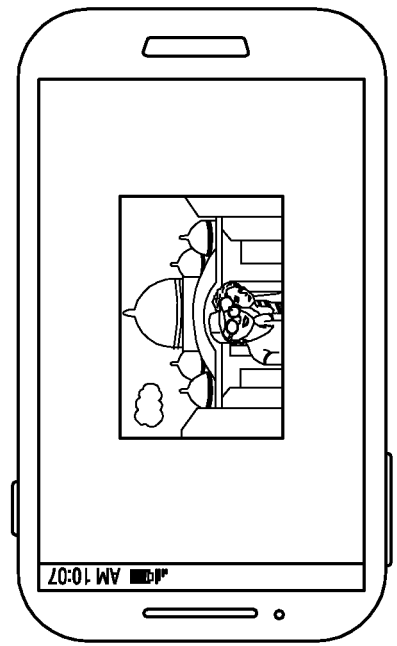
FIG.5A
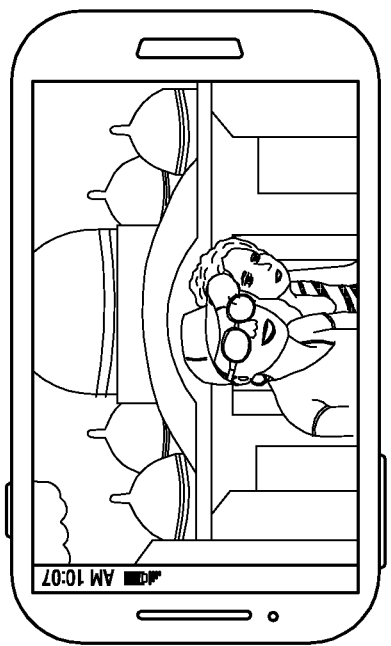
FIG.5B

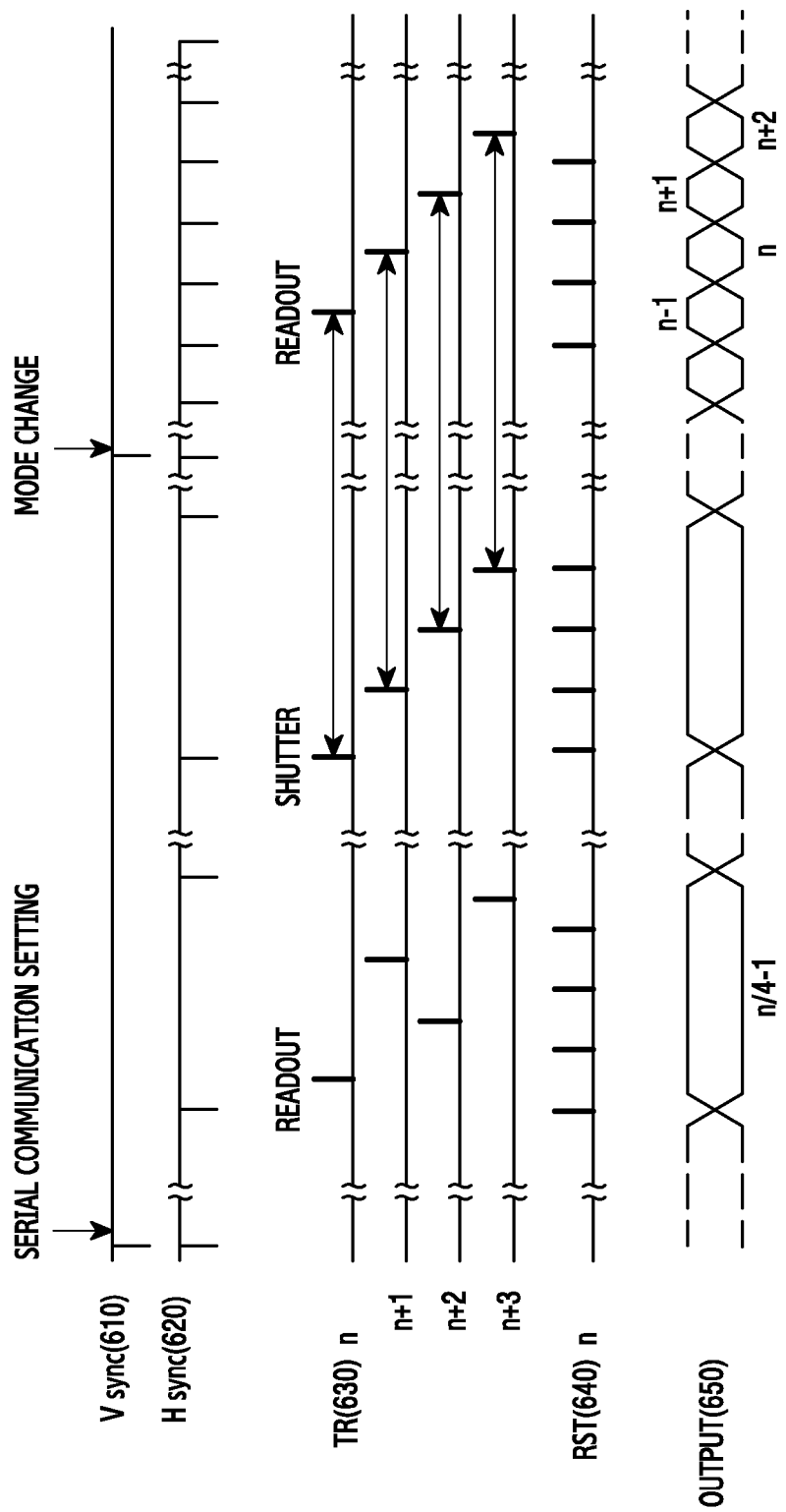

METHOD FOR ENHANCING NOISE CHARACTERISTICS OF IMAGE AND ELECTRONIC DEVICE THEREOF

RELATED APPLICATION(S)

This application claims priority under 35 U.S.C. §119(a) to a Korean Patent Application entitled "METHOD FOR ENHANCING NOISE CHARACTERISTICS OF IMAGE AND AN ELECTRONIC DEVICE THEREOF" filed in the Korean Intellectual Property Office on Sep. 15, 2014, and assigned Ser. No. 10-2014-0121704, the contents of which are herein incorporated by reference.

BACKGROUND

Various exemplary embodiments relate to an electronic device and, more particularly, relate to an image processing method of an electronic device.

In modern society, various forms of electronic devices become common, and the past respectively existing devices tend to be integrated with one another. Recently, the growth of technologies of portable electronic devices is under progress centering on portable phones, and the portable phones go beyond merely a function of telephony and are providing not only data communication but also functions of conventional separate devices such as cameras, camcorders, etc.

Various electronic devices including the portable phones can provide an image photographing function. In photographing an image, the electronic device recognizes light inputted through a lens by a sensor, and digitizes and stores the image recognized by the sensor. At this time, the quality of the recorded image processed within the electronic device after inputted may be different according to the external environment (e.g., light, etc.) where a subject is placed.

SUMMARY

At image photographing through an electronic device, a quality of an image may be different according to the external environment where a subject is placed. Particularly, an environment where a light is low, in other words, a low-light environment may greatly deteriorate the quality of the image. Recently, a resolution of an image sensor of the electronic device tends to increase gradually. This leads to a decrease of the size of a unit pixel due to the restriction of the size of a sensor module. Accordingly, a quantity of accepted light per unit pixel decreases gradually. The decrease of the light quantity may bring about an increase of noise, deteriorating the quality of the image photographed in the low-light environment.

According to one exemplary embodiment of the present disclosure, there may be provided an apparatus and method for photographing an image in an electronic device.

According to another exemplary embodiment of the present disclosure, there may be provided an apparatus and method for enhancing a quality of an image in an electronic device.

According to a further exemplary embodiment of the present disclosure, there may be provided an apparatus and method for enhancing noise characteristics of an image in an electronic device.

According to a yet another exemplary embodiment of the present disclosure, there may be provided an apparatus and method for generating an image including a relatively less noise in an electronic device.

According to a still another exemplary embodiment of the present disclosure, there may be provided an apparatus and method for combining images of different noise characteristics in an electronic device.

An electronic device according to various exemplary embodiments of the present disclosure is provided. The electronic device may include at least one image sensor, and a processor to generate a plurality of images having different noise characteristics through the at least one image sensor, and combine the plurality of images.

An operation method of an electronic device according to various exemplary embodiments of the present disclosure is also provided. The operation method may include generating a plurality of images having different noise characteristics, and combining the plurality of images.

Another operation method of an electronic device operating in an environment according to various exemplary embodiments of the present disclosure is also provided. The operation method may include determining if the environment is a low-light environment, if it is the low-light environment, converting a mode into a binning mode, and combining a second image acquired in the binning mode and a first image having a higher resolution than the second image.

According to various exemplary embodiments, despite a low-light environment, an electronic device may generate an image having a higher resolution and excellent noise characteristics.

BRIEF DESCRIPTION OF THE DRAWINGS

The above and other objects, features and advantages of the present invention will become more apparent from the following detailed description when taken in conjunction with the accompanying drawings in which:

FIG. 5A illustrates the final image when a binning mode only is applied in an electronic device;

FIG. 5B illustrates the final image applying an exemplary embodiment of the present disclosure;

FIG. 6 illustrates a control timing of a sensor for converting into a binning mode in an electronic device according to various exemplary embodiments;

DETAILED DESCRIPTION

Figure 1:
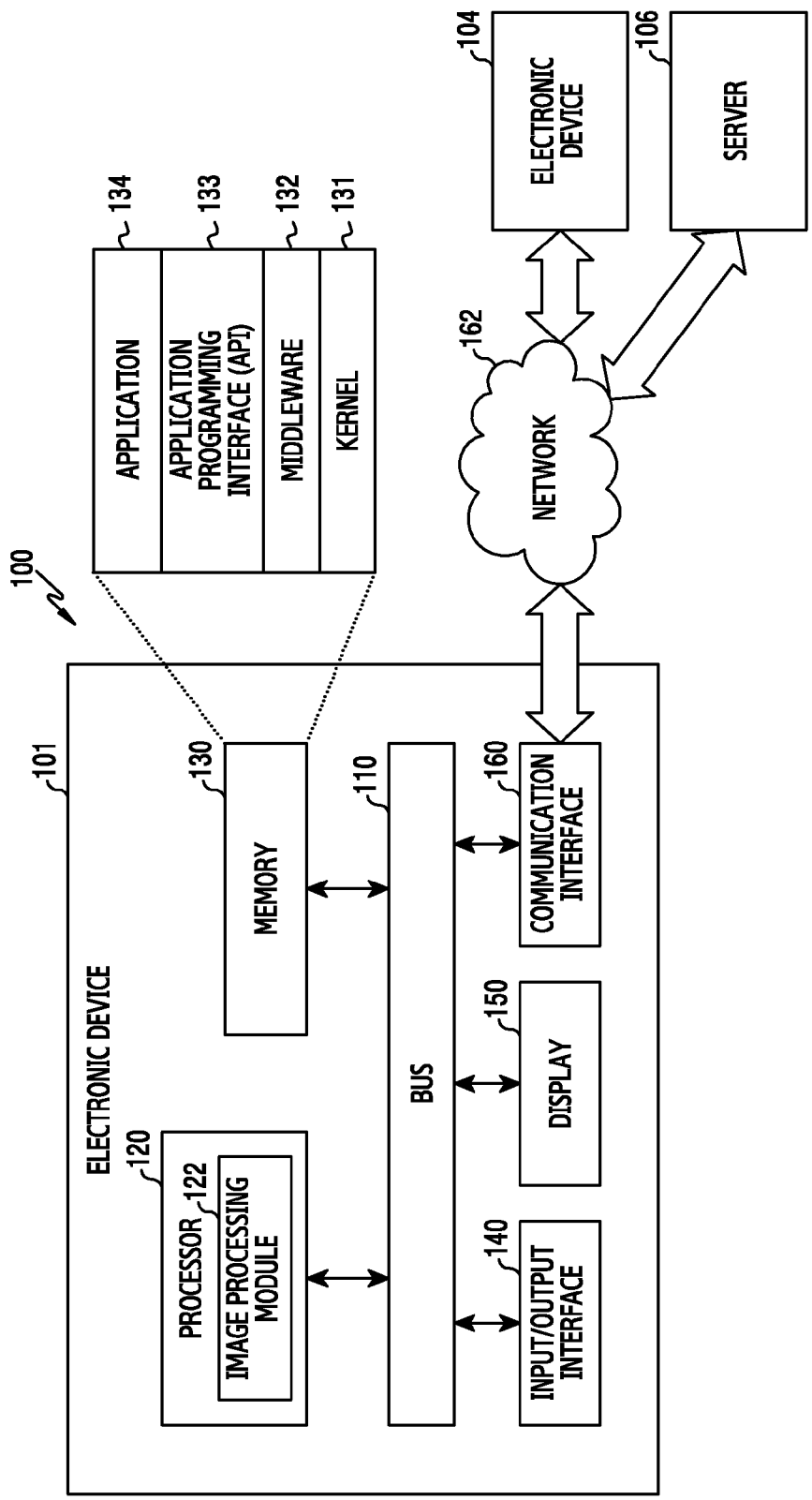
FIG. 1 illustrates a network environment including an electronic device according to various exemplary embodiments.

Hereinafter, various embodiments of the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

The term "or" in various embodiments of the disclosure means the inclusion of at least one or all of the disclosed elements. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first structural element may be named a second structural element. Similarly, the second structural element also may be named the first structural element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are merely for the purpose of describing particular embodiments and are not intended to limit the present disclosure. As used herein, singular forms may include plural forms as well unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be, but is not limited to, a device including a function of a camera module or a communication. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

In various embodiments of the present disclosure described below, "contents" may include pictures or moving images and mean objects which can be classified according to each category within an electronic device, but are not limited to particular forms or types. Accordingly, any objects which can be classified according to each category as well as the pictures or moving images may be included in contents according to embodiments of the present disclosure. Further, for example, the contents may be stored in the file form, but various embodiments of the present disclosure are not limited thereto.

In various embodiments of the present disclosure described below, "category" may mean a unit for classifying the contents, and may be expressed as, for example, at least one word or keyword. Further, each category may be configured in a hierarchical structure and one category may be connected to at least another category (e.g., a higher category or a lower category) according to embodiments of the present disclosure.

Hereinafter, an electronic device according to various embodiments of the present disclosure will be described with reference to the accompanying drawings. The term "user" used in the various embodiments may refer to a person or a device using the electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, and a communication interface 160.

The bus 110 may be a circuit to connect the above-described components with each other and to transfer communication (e.g., control messages) among the above-described components.

The processor 120 may include an image processing module 122 in accordance with an exemplary embodiment of the present disclosure. The image processing module 122 processes an image signal. For example, the image processing module 122 may process at least a part of information acquired from other constituent elements (e.g., the processor 120, the memory 130, the input/output interface 140, or the communication interface 160, etc.), and provide this to a user in various methods. For example, the image processing module 122 may control at least a partial function of the electronic device 101, using the processor 120 or independently from this. The image processing module 122 may be denoted as an 'Image Signal Processor (ISP)'. FIG. 1 exemplifies that the image processing module 122 is included within the processor 120. In accordance with another exemplary embodiment of the present disclosure, the image processing module 122 may be isolated from the processor 120. Through FIG. 2 described later, additional information about the image processing module 122 is provided.

The memory 130 may be non-transitory, and may store instructions or data received from the processor 120 or other components (e.g., the input/output interface 140, the display 150, the communication interface 160, or the like) or generated by the processor 120 or other components. The memory 130 may include programming modules, for example, a kernel 131, middleware 132, an Application Programming Interface (API) 133, applications 134, or the like. The aforementioned programming modules may be formed of software, firmware, hardware, or a combination of at least two thereof. Further, according to various embodiments, various pieces of information (e.g., content information, category structure information, or content classification information) may be stored in the memory 130.

The kernel 131 may control or manage system resources (e.g., the bus 110, the processor 120, the memory 130, or the like) which are used for performing operations or functions implemented by other programming modules, for example, the middleware 132, the API 133 or the applications 134. Furthermore, the kernel 131 may provide an interface through which the middleware 132, the API 133, and the application 134 may access individual components of the electronic device 101 to control or manage them.

The middleware 132 may perform a relay function to allow the API 133 or the applications 134 to communicate with the kernel 131 to exchange data. Further, in relation to requests for an operation received from the application 134, the middleware 132 may control (e.g., scheduling or load-balancing) the requests using system resources (e.g., the bus 110, the processor 120, the memory 130, or the like) of the electronic device 101 with respect to at least one application among the applications 134.

The API 133 is an interface by which the applications 134 control functions provided from the kernel 131 or the middleware 132, and may include, for example, at least one interface or function (e.g., instructions) for a file control, a window control, an image processing, a text control, or the like.

According to various embodiments, the applications 134 may include a Short Message Service (SMS)/Multimedia Messaging Service (MMS) application, an email application, a calendar application, an alarm application, a health care application (e.g., application for measuring a quantity of exercise or blood sugar) or an application (e.g., application providing information associated with pressure, humidity or temperature). Additionally or alternatively, the applications 134 may be applications related to the exchange of information between the electronic device 101 and other electronic devices (e.g., electronic device 104). The applications related to the exchange of information may include, for example, a notification relay application for transferring predetermined information to the other electronic device (e.g., the electronic device 104) or a device management application for managing the other electronic device (e.g., the electronic device 104).

According to the various embodiments, the applications 134 may include an application designated according to a property (e.g., a kind of the electronic device 101) of the second electronic device (e.g., the electronic device 104). For example, when the other electronic device is an MP3 player, the applications 134 may include an application related to the reproduction of music. Similarly, when the second electronic device is a mobile medical device, the applications 134 may include an application related to the health care. According to an embodiment, the applications 134 may include at least one of an application designated to the electronic device 101 and an application received from a second electronic device (e.g., a server 106 or the electronic device 104).

The input/output interface 140 may transfer commands or data, which are input by a user through input/output devices (e.g., sensors, keyboards, or touch screens), to the processor 120, the memory 130, or the communication interface 160 through, for example, the bus 110. For example, the input/output interface 140 may provide the processor 120 with data for a user's touch input through the touch screen. Further, through the input/output device (e.g., a speaker or a display), the input/output interface 140 may display instructions or data received from the processor 120, the memory 130, the communication interface 160 through, for example, the bus 110. For example, the input/output interface 140 may output voice data processed by the processor 120 to the user through the speaker. For example, according to various embodiments, the input/output interface 140 may receive at least one of a request for generating contents, a request for receiving contents, a request for analyzing contents, a request for classifying, and a request for displaying classified contents from the user. The processor 120, the memory 130, or the display 150 may perform a corresponding function according to each of the requests through the input/output interface 140.

The display 150 may display various pieces of information (e.g., multimedia data or text data) for the user. Further, according to various embodiments of the present disclosure, the display 150 may display, on a screen, an input window or an input pad through which various characters, numbers, and symbols can be input into the input window in various ways. According to various embodiments, the display 150 may display one or more contents or a list of contents according to a request for displaying the contents through the input/output interface 140. When the request for displaying the content list is received, the display 150 may display each content list in updated category structure form according to various embodiments.

The communication interface 160 may connect communication between the electronic device 101 and a second electronic device (e.g., the electronic device 104 or the server 106). For example, the communication interface 160 may be connected to a network 162 through wireless or wired communication to communicate with the second electronic device. The wireless communication may include at least one of, for example, a Wireless Fidelity (Wi-Fi), a Bluetooth (BT), a Near Field Communication (NFC), a Global Positioning System (GPS) and a cellular communication (e.g., an LTE, an LTE-A, a CDMA, a WCDMA, a UMTS, a WiBro, a GSM or the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a communication network. The communication network may include at least one of a computer network, the Internet, the Internet of things, and a telephone network. According to an embodiment, a protocol (e.g., a transport layer protocol, a data link layer protocol, or a physical layer protocol) for the communication between the electronic device 101 and the second electronic device may be supported by at least one of the applications 134, the API 133, the middleware 132, the kernel 131, and the communication interface 160.

According to an embodiment, the server 106 may support driving of the electronic device 101 by conducting at least one of the operations (or functions) implemented in the electronic device 101.

FIG. 1 illustrates that the electronic device 101 includes the communication interface 160 to communicate with the electronic device 104, the server 106, or the like through the network 162. But, according to another embodiment of the present disclosure, the electronic device 101 may be implemented to independently operate without an additional communication function.

Figure 2:
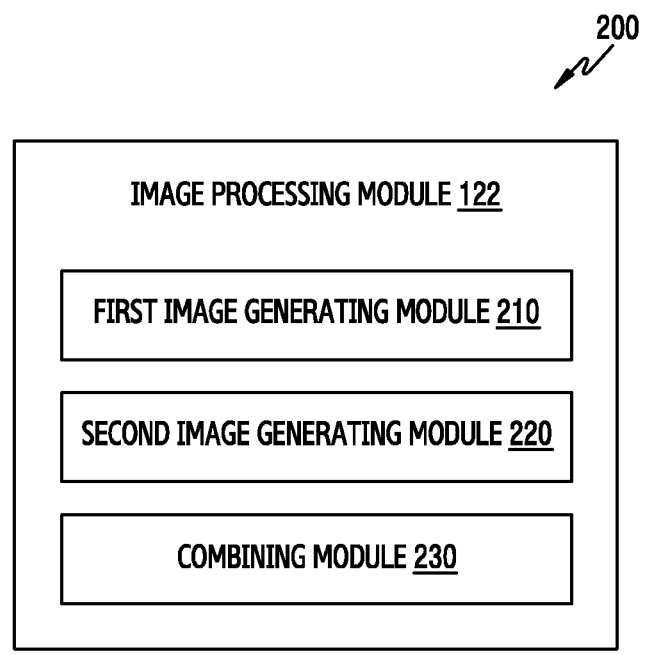
FIG. 2 illustrates a block diagram of an image processing module of an electronic device according to various exemplary embodiments.

FIG. 2 illustrates a block diagram 200 of an image processing module 122 of an electronic device (e.g., the electronic device 101 of FIG. 1) according to various exemplary embodiments.

Referring to FIG. 2, the image processing module 122 may include a first image generating module 210, a second image generating module 220, and a combining module 230.

The first image generating module 210 generates, for example, an image having a relatively high resolution and much noise. In other words, the first image generating module 210 generates an image having a relatively high resolution and a lower Signal-to-Noise Ratio (SNR). The second image generating module 220 generates, for example, an image having a relatively low resolution and less noise. In other words, the second image generating module 220 may downscale the image, or generate the image in a binning scheme. The combining module 230 combines the two images generated by the first image generating module 210 and the second image generating module 220. At this time, the combining module 230 may combine the images after granting different weights to the respective images. The weight may be applied to the whole image or to one ore more evenly divided areas of the image.

Figure 3:
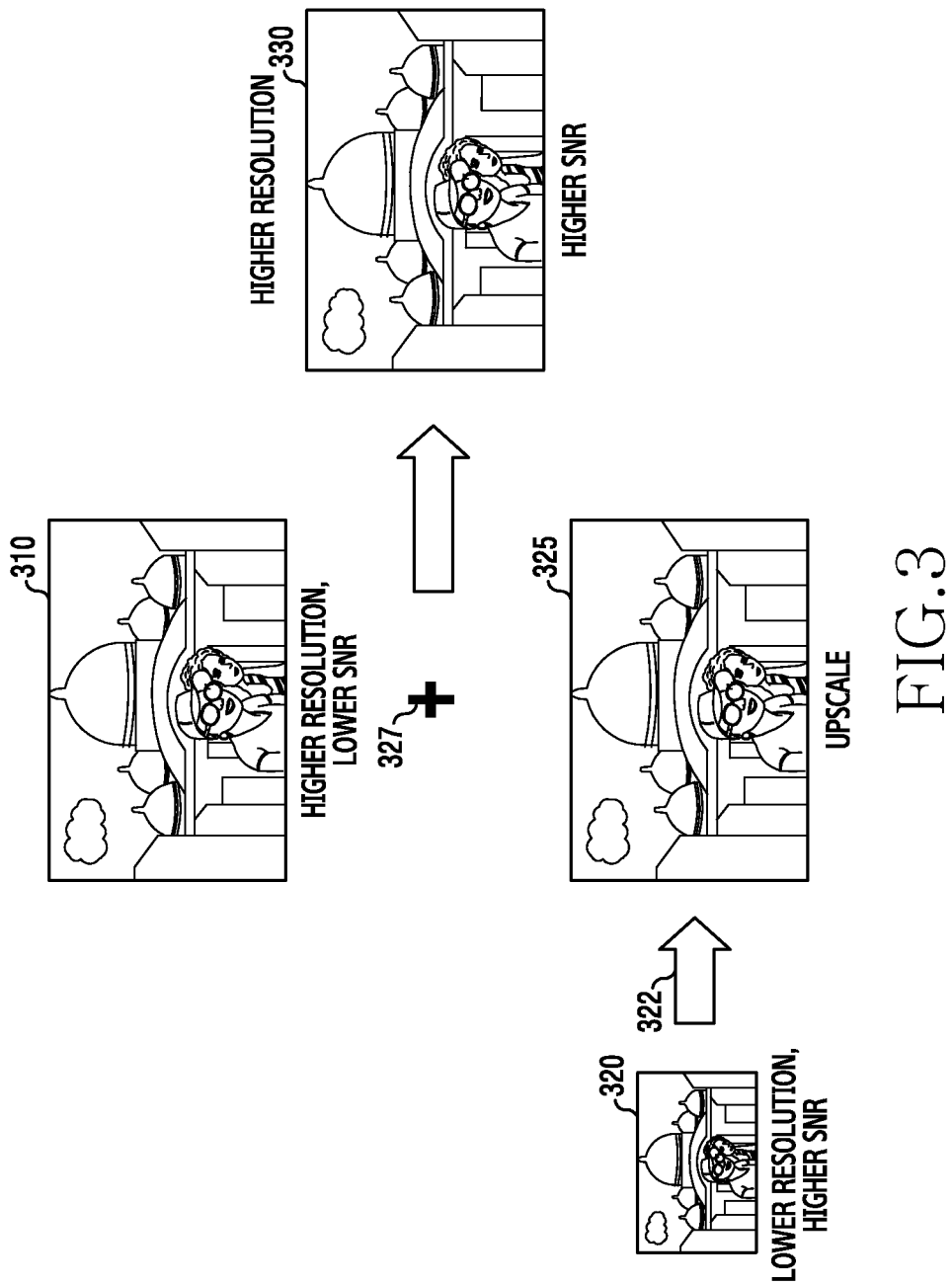
FIG. 3 illustrates an image processing procedure in an electronic device according to various exemplary embodiments.

FIG. 3 illustrates an image processing procedure in an electronic device (e.g., the electronic device 101 of FIG. 1) according to various exemplary embodiments.

Referring to FIG. 3, the electronic device combines a plurality of images. In case of FIG. 3, two images are exemplified. However, three or more images may be combined in accordance with various exemplary embodiments of the present disclosure. The electronic device acquires a first image 310 of a higher resolution and a lower SNR. And, the electronic device acquires a second image 320 of a lower resolution and a higher SNR. For example, the second image 320 may be acquired through a binning mode, or be acquired by downscaling the first image 310, in other words, converting the first image 310 into a lower-resolution image.

The electronic device upscales the second image 320 in an upscaling process 322. In other words, the electronic device increases the resolution of the second image 320 such that the resolution of the second image 320 is consistent with the resolution of the first image 310. With regards to the upscaling process 322, various widely-known techniques may be applied. For example, the electronic device may generate new pixels from respective pixels of the second image 320. At this time, the electronic device may set a value of each of the new pixels identically with a value of a pixel of the second image 320 similar to a pixel of the first image 310, or set the value of each of the new pixels by a value drawn from at least one pixel of the second image 320 similar to the pixel of the first image 310. As such, an upscaled third image 325 is generated. The third image 325 has a higher SNR compared to the second image 320.

After that, the electronic device combines the first image 310 and the third image 325 in a combining operation 327. In the combining operation 327, for example, the electronic device averages values of mutually corresponding pixels between the first image 310 and the third image 325. At this time, the electronic device may grant different weights to the first image 310 and the third image 325 in accordance with various exemplary embodiments of the present disclosure. The weight may be different according to a concrete exemplary embodiment. For example, the weight may be determined based on at least one of a level of an edge existing in an image, a level of noise of the image, and a lighting (or light) of the image. As a concrete example, in a case that there are many edges in the image, the first image 310 may be granted a higher weight. For another example, in a case that there is much noise in the image, the third image 325 may be granted a higher weight. The weights may be equally applied to the whole of the first image 310 and the third image 325, or be applied in a pixel setup unit of a constant size, or be applied in a pixel unit. As such, the final image 330 having a higher resolution compared to the second image 320 and having a higher SNR compared to the first image 310 may be generated.

In an exemplary embodiment described with reference to FIG. 3, the second image 320 may be acquired through a binning mode, or be acquired by downscaling the first image 310. A binning mode is a technique for obtaining the effect of increasing a quantity of light inputted to a sensor by adding input values of the sensor. The binning mode is given as in FIG. 4 below.

Figure 4:
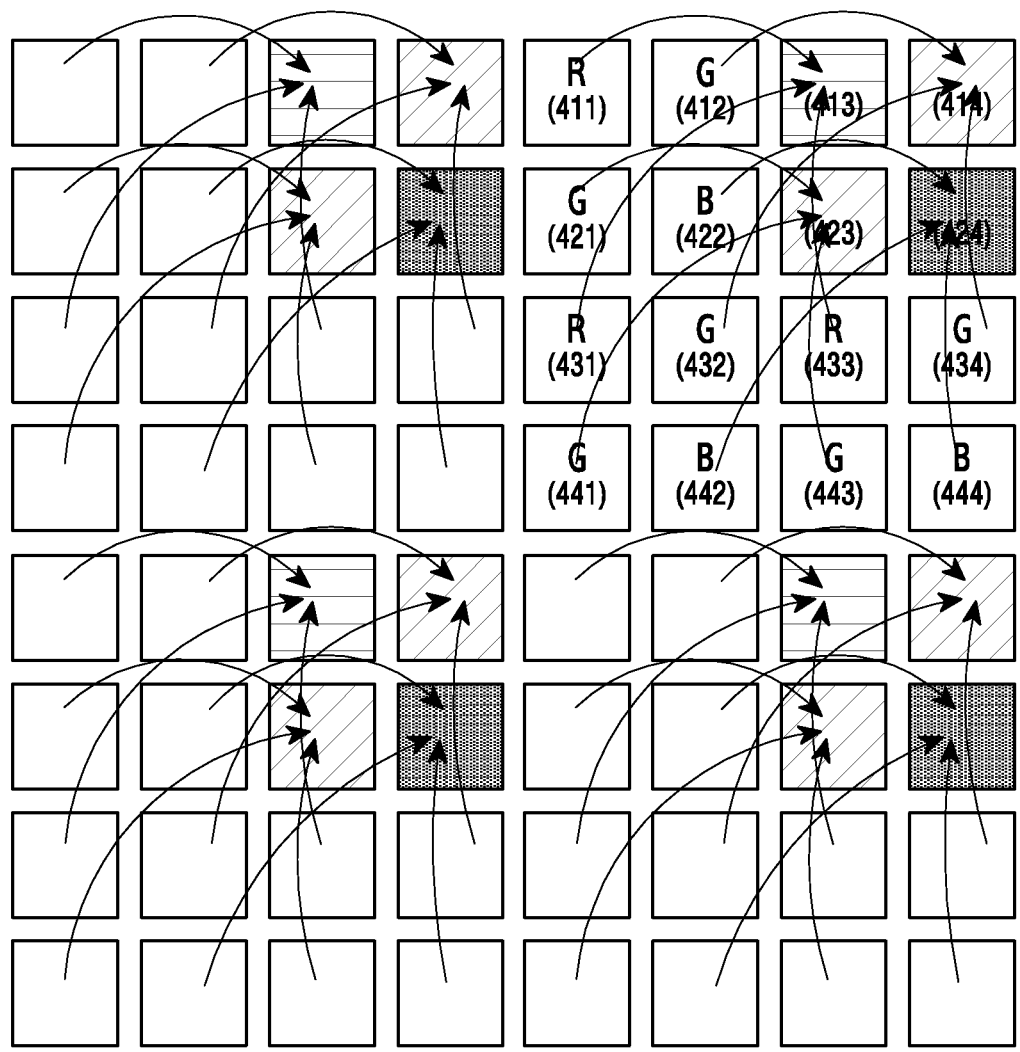
FIG. 4 illustrates an operation of a binning mode in an electronic device according to various exemplary embodiments.

FIG. 4 illustrates an operation of a binning mode in an electronic device (e.g., the electronic device 101 of FIG. 1) according to various exemplary embodiments.

FIG. 4 exemplifies the generation of a 2×2 binning image. That is, FIG. 4 exemplifies a case that 2×2 signals construct one pixel. Referring to FIG. 4, sensor units are divided into Red (R), Green (G), and Blue (B). The sensor unit of R may recognize red light, and the sensor unit of G may recognize green light, and the sensor unit of B may recognize blue light. Input signals of the sensor units recognizing the same-color light are added up. In detail, input values detected in sensor units 411, 413, 431, and 433 are added up as one, and input values detected in sensor units 412, 414, 432, and 434 are added up as one, and input values detected in sensor units 422, 424, 442, and 444 are added as one. The adding of the input values may result in the effect of averaging the noise and thus, increase noise characteristics, that is, an SNR. A pattern of adding the sensor input values according to the binning mode illustrated in FIG. 4 is one example. In accordance with another exemplary embodiment of the present disclosure, adding patterns of various schemes may be applied.

FIG. 5A illustrates the final image applying only a binning mode in an electronic device (e.g., the electronic device 101 of FIG. 1). FIG. 5B illustrates the final image applying an exemplary embodiment of the present disclosure.

FIG. 5A and FIG. 5B compare the sizes of the final images when applying only a 2×2 binning mode and when applying an exemplary embodiment of the present disclosure, respectively. Referring to FIG. 5A, the applying of the 2×2 binning mode may result in the enhancement of noise characteristics, but cause a decrease of a resolution of the image to the half. However, referring to FIG. 5B, the applying of the exemplary embodiment of the present disclosure results in the enhancement of the noise characteristics and also the maintenance of the resolution of the image.

FIG. 6 illustrates a control timing of a sensor for converting into a binning mode in an electronic device (e.g., the electronic device 101 of FIG. 1) according to various exemplary embodiments.

FIG. 6 exemplifies a control timing for seamlessly converting into the binning mode.

Referring to FIG. 6, Vertical synchronization (V sync) 610 indicates a synchronization timing of a frame unit, and Horizontal synchronization (H sync) 620 indicates a synchronization timing of each row unit of a frame. Transfer pulse (TR) 630 is controlled by each row. RST 640 denotes a control timing of a Reset Transistor. Output 650 denotes outputted image data.

Referring to FIG. 6, while a readout operation of a binning mode is maintained, a shutter operation of a next frame is converted. Through the internal control of the sensor as illustrated in FIG. 6, an electronic device continuously operates without the initialization of the whole sensor units, whereby seamless mode conversion is made available. Also, the binning mode leads to a decrease of a data quantity of an image, but the image processing module within the electronic device may output data of the same size of the image by using dummy data.

Figure 7:
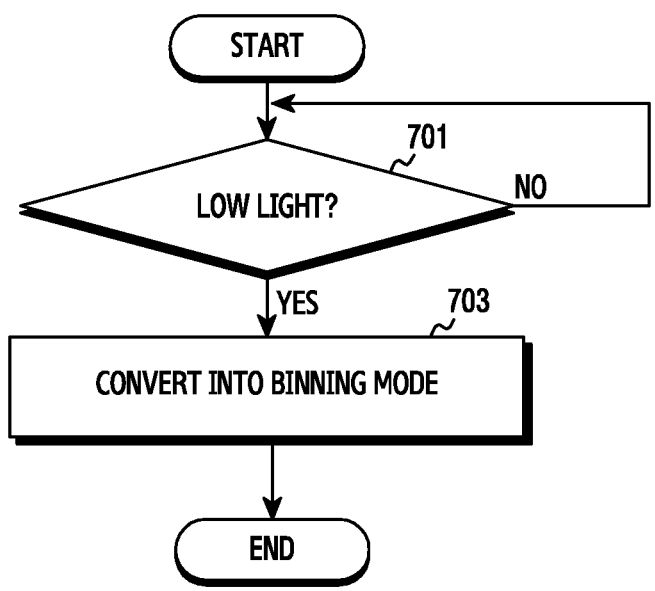
FIG. 7 illustrates an operation procedure of an electronic device according to various exemplary embodiments.

FIG. 7 illustrates an operation procedure of an electronic device (e.g., the electronic device 101 of FIG. 1) in an environment according to various exemplary embodiments.

Referring to FIG. 7, in operation 701, the electronic device determines if the environment is a low-light environment. For example, the electronic device may measure the light or lighting through a brightness of an image inputted through a sensor of a camera. In accordance with another exemplary embodiment of the present disclosure, the electronic device may have a separate light sensor, and may measure the light through the light sensor. If the measured light is equal to or is less than a threshold value, the electronic device may determine that the environment is a low-light environment.

If the environment is a low-light environment, the electronic device (e.g., the electronic device 101 of FIG. 1) proceeds to operation 703 and converts or enters into a binning mode. At this time, the electronic device may perform seamless binning mode conversion. In detail, the electronic device may convert or enter into the binning mode without initialization of an image sensor. In accordance with another exemplary embodiment, the electronic device may initialize the image sensor for the purpose of conversion into the binning mode.

According to an exemplary embodiment illustrated in FIG. 7, if it is determined that the environment is a low-light environment, the electronic device converts or enters into the binning mode. Generally, to improve the deterioration of a quality of an image taken in low light, the electronic device may increase an exposure time, or increase a gain of a sensor. Accordingly, in accordance with another exemplary embodiment of the present disclosure, in case that the environment is a low-light environment, the electronic device may determine whether to increase the exposure time or to increase a gain of its sensor. Thereafter, if the exposure time and the sensor gain are maximized or approach their respective maximal values, the electronic device may proceed to operation 703. That is, if the exposure time and the sensor gain are not maximal despite the low-light environment, the electronic device may increase the exposure time and/or increase the sensor gain.

Figure 8:
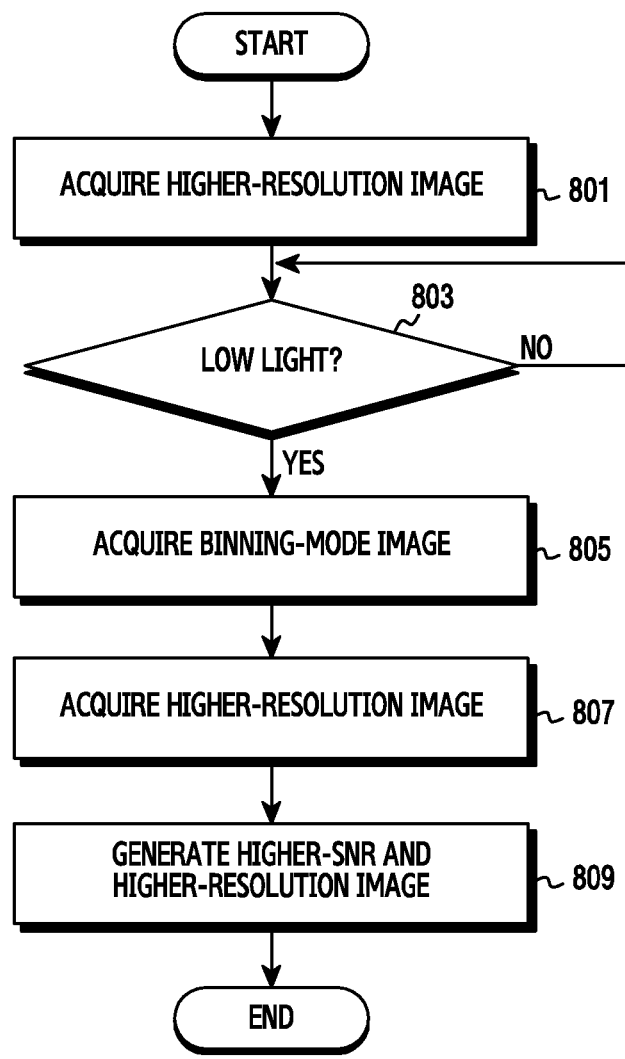
FIG. 8 illustrates an operation procedure of an electronic device according to various exemplary embodiments.

FIG. 8 illustrates an operation procedure of an electronic device (e.g., the electronic device 101 of FIG. 1) according to various exemplary embodiments.

Figure 9A:
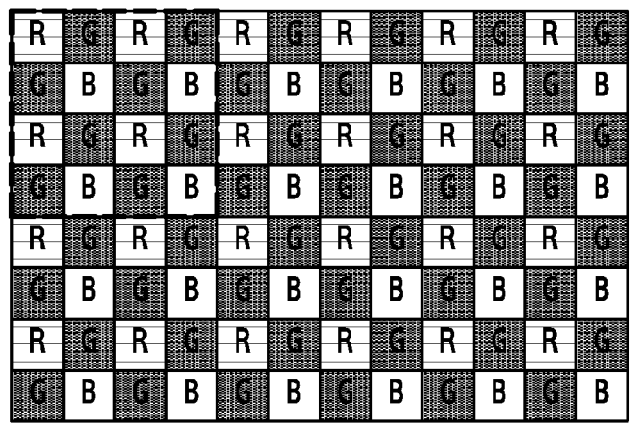
FIGS. 9A to 9E illustrate examples of image data processed in an electronic device according to various exemplary embodiments.

Referring to FIG. 8, in operation 801, the electronic device acquires an image of a higher resolution. Here, the higher resolution indicates a relatively higher resolution compared to a binning mode image acquired in operation 805 below. The image of the higher resolution may be acquired from an image for a preview picture. The preview picture may be generated by downscaling an image outputted from an image sensor. At this time, the image before downscaling may be used as the image of the higher resolution. In other words, the electronic device may use the image for the preview picture, which is outputted from the image sensor, as the image of the higher resolution. Or, in operation 801, the electronic device may capture an image inputted to the image sensor. For example, the image of the higher resolution may be constructed by sensor input values of FIG. 9A.

Next, in operation 803, the electronic device determines if the environment is a low-light environment. For example, the electronic device may measure a light through the brightness of an image inputted through a sensor of a camera. In accordance with another exemplary embodiment of the present disclosure, the electronic device may have a separate light sensor, and may measure the light through the light sensor. In case that the separate light sensor is provided, operation 803 may be omitted. If the measured light is equal to or is less than a threshold value, the electronic device may determine that it is the low light.

Figure 9B:
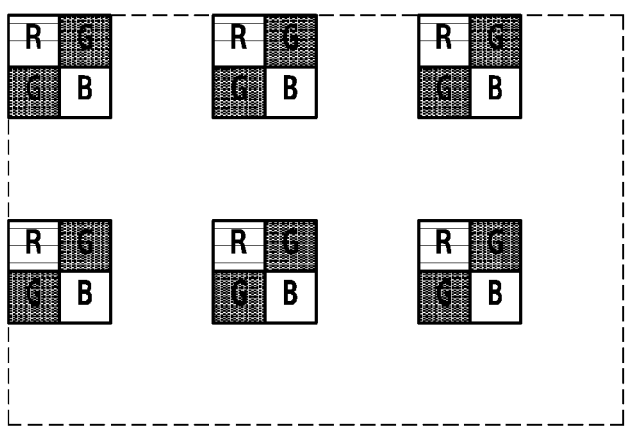
Figure 9C:
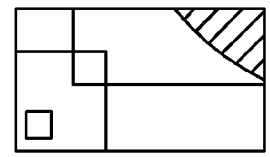

If the environment is a low-light environment, the electronic device proceeds to operation 805 and acquires an image of a binning mode. In detail, the electronic device captures an image after converting into the binning mode. At this time, the electronic device may convert into the binning mode without initialization of the image sensor, for seamless binning mode conversion, or initialize the image sensor for conversion into the binning mode. If performing the seamless binning mode conversion, the electronic device may insert dummy data to sensor input values and maintain a data quantity per frame. For example, the binning mode image may consist of sensor input values of FIG. 9B. Also, the binning mode image may have a size of FIG. 9C.

Figure 9D:
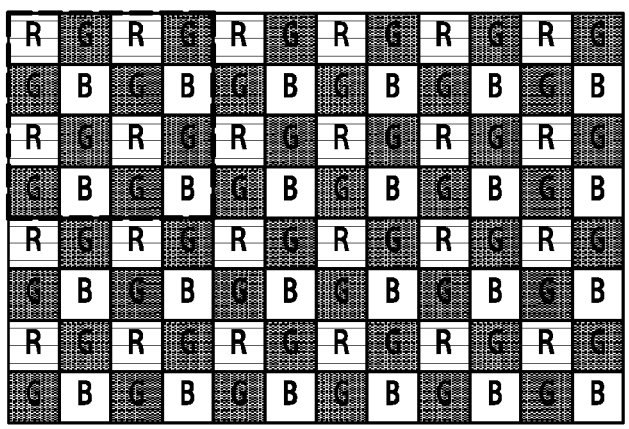
Figure 9E:
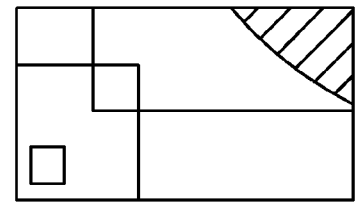

Next, the electronic device proceeds to operation 807 and acquires an image of a higher resolution. The image of the higher resolution has a relatively higher resolution than the binning mode image acquired in operation 805. That is, the electronic device releases the binning mode and captures the image of the higher resolution. However, in accordance with another exemplary embodiment of the present disclosure, the electronic device may use the image acquired in operation 801. In this case, operation 807 may be optional. For example, the image of the higher resolution may consist of sensor input values of FIG. 9D. Also, the image of the higher resolution may have a size of FIG. 9E.

After that, the electronic device proceeds to operation 809 and generates an image having a higher SNR and a higher resolution. In other words, the electronic device combines the binning mode image acquired in operation 805 and the image of the higher resolution acquired in operation 807 or operation 801. For the combining, the electronic device may upscale the binning mode image into a higher resolution. And, the electronic device may average values of mutually corresponding pixels between the two images such as the upscaled image, and the image of the higher resolution, etc. At this time, in accordance with various exemplary embodiments of the present disclosure, the electronic device may grant different weights to the two images. The weight may be different in accordance with a concrete exemplary embodiment. For example, in case that there are the number of edges equal to or greater than a threshold value in the image acquired in operation 801 or operation 807, a higher weight may be granted to the image acquired in operation 801 or operation 807. For another example, in case that there are many noises equal to or greater than a threshold value in the binning mode image acquired in operation 805, in other words, in case that an SNR is equal to or is less than a threshold value, a higher weight may be granted to the binning mode image acquired in operation 805. The weights may be equally applied to the whole of the two images, or be applied in a pixel setup unit of a constant size, or be applied in a pixel unit.

According to an exemplary embodiment illustrated in FIG. 8, in operation 805, the electronic device acquires the image of the binning mode after converting into the binning mode. However, operation 805 may be replaced with an operation of downscaling the image in accordance with another exemplary embodiment of the present disclosure. For example, the electronic device may decrease a resolution of the image of the higher resolution acquired in operation 801. In this case, the electronic device may generate an image having a relatively less number of pixels. At this time, a value of each of new pixels may be determined based on a value of at least one pixel belonging to a corresponding range of the image of the higher resolution. For example, if one pixel of the downscaled image corresponds to four pixels of the image of the higher resolution, a value of the one pixel may be determined as an average of the values of the four pixels.

In operation 809, the images may be combined to each other, and be granted different weights. In case that the weights are determined based on a level of an edge, the electronic device may calculate the level of the edge although not illustrated in FIG. 8. That is, after calculating a parameter indicating a level of an edge of an image, the electronic device may determine weights to be applied to the respective two images according to the parameter. The edge indicates a position of a subject in an image, a shape and size of the subject, and texture information, and exists in a point where the brightness of the image is varied suddenly. According to this, the electronic device may calculate a degree of sudden variation of the brightness of the image, thereby calculating the level of the edge. For example, the electronic device may use Modulation Transfer Function (MTF), Spacial Frequency Response (SFR) analysis, etc. to determine the level of the edge. The SFR, when expressing the brightness of pixels by values, expresses the variation of the values by a frequency. The SFR indicates that the more edges there are, the higher the frequency is.

For another example, to calculate the level of the edge, the electronic device may detect the edge and determine the level of the edge from the detection result. That is, the electronic device may probe a portion in which the brightness of an image is varied suddenly, in other words, a portion in which a difference of the image brightness is equal to or is greater than a threshold value, thereby detecting the edge. And, the electronic device may calculate a rate (e.g., a width of an area, and the number of pixels) of occupation of the edge in the whole image, thereby determining the level of the edge. As an example, the electronic device may use a homogeneity scheme, a difference scheme, etc. to detect the edge. In detail, the electronic device may subtract respective values of peripheral pixels from a specific center pixel, and use a subtraction result to determine the edge. Or, the electronic device may perform a plurality of subtractions per pixel, thereby detecting the edge.

Figure 10:
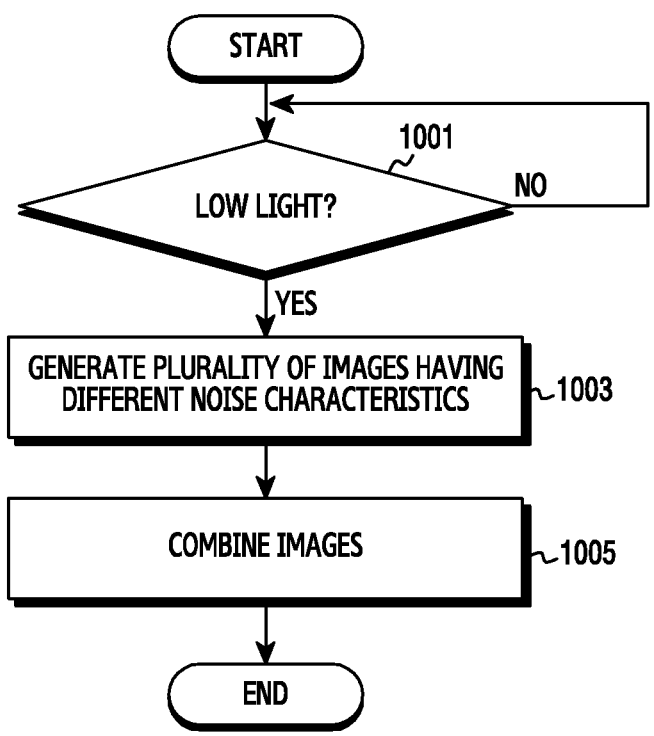
FIG. 10 illustrates an operation procedure of an electronic device according to various exemplary embodiments.

FIG. 10 illustrates an operation procedure of an electronic device (e.g., the electronic device 101 of FIG. 1) according to various exemplary embodiments.

Referring to FIG. 10, in operation 1001, the electronic device determines if the environment is a low-light environment. For example, the electronic device may measure a light through the brightness of an image inputted through a sensor of a camera. In accordance with another exemplary embodiment of the present disclosure, the electronic device may have a separate light sensor, and may measure the light through the light sensor. If the measured light is equal to or is less than a threshold value, the electronic device may determine that the environment is a low-light environment.

If the environment is a low-light environment, the electronic device proceeds to operation 1003 and generates a plurality of images having different noise characteristics. In other words, the electronic device generates two or three or more images having different SNRs. For example, the electronic device may generate a first image and then, convert into a binning mode in order to generate a second image having more excellent noise characteristics than the first image. Or, the electronic device may generate the first image, and downscale the first image to thereby generate the second image. At this time, the plurality of images may have resolutions different from one another. Here, the first image may be one of an image outputted from the image sensor before generation of the second image or an image photographed after acquiring the second image. For example, the image outputted from the image sensor before the generation of the second image may be an image detected for a preview picture.

Thereafter, the electronic device proceeds to operation 1005 and combines the images. At this time, if resolutions of the images are different, the electronic device may upscale or downscale a part or all of the images, thereby normalizes the resolutions of the images. For example, the electronic device may upscale the partial image to the highest resolution. Also, in combining the images, the electronic device may grant different weights to the images respectively. The electronic device may equally apply the weights to the whole images, or apply in a pixel setup unit of a constant size, or apply in a pixel unit. The weights may be determined differently according to a concrete exemplary embodiment. For example, the weight may be determined based on a level of an edge existing in an image, and a level of noise.

Figure 11:
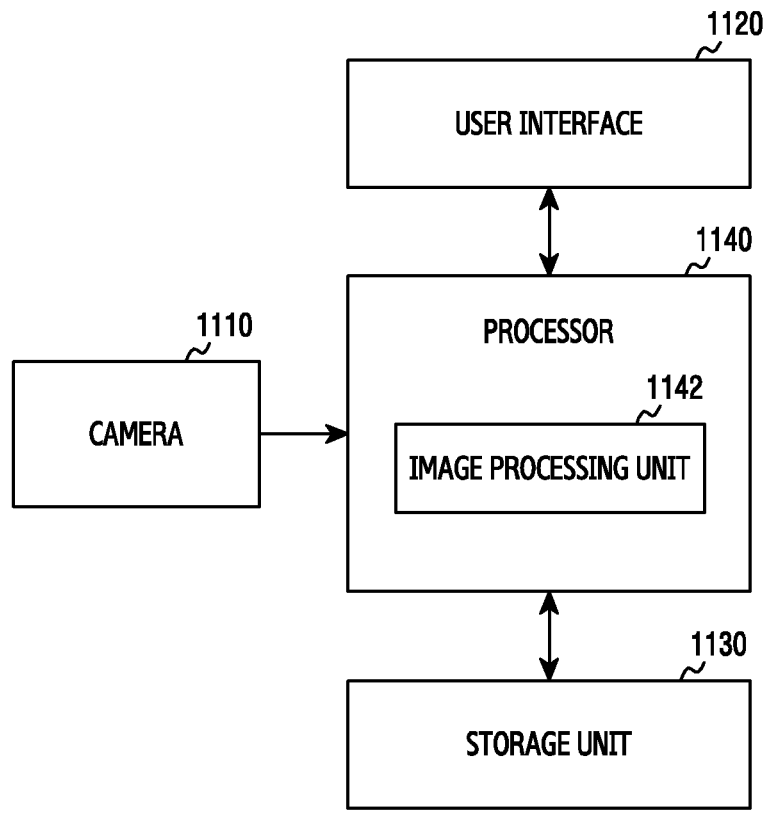
FIG. 11 illustrates a block diagram of an electronic device according to various exemplary embodiments.

FIG. 11 illustrates a block diagram of an electronic device (e.g., the electronic device 101 of FIG. 1) according to various exemplary embodiments.

Referring to FIG. 11, the electronic device includes a camera 1110, a user interface 1120, a storage unit 1130, and a control unit 1140.

The camera 1110 performs a function of photo shooting, video recording, etc. The camera 1110 may include an image sensor, a lens, etc. The image sensor may be at least one of a Charged Coupled Device (CCD) and a Complementary Metal-Oxide Semiconductor (CMOS). For example, the camera 1110 recognizes by the image sensor light inputted through a lens, and makes an image recognized through the image sensor, as digital data.

The user interface 1120 includes an output to provide information to a user and an input to recognize a user's instruction. For example, the user interface 1120 may display a preview picture at image photographing, and display a generated image in accordance with various exemplary embodiments of the present disclosure. The output and the input may be implemented as separate independent constituent elements, or may be implemented as one constituent element. For example, the output means and the input means may be implemented as a touch screen. In this case, the user interface 1120 uses capacitive, resistive, infrared and surface acoustic technologies for determining at least one contact point as well as a multi-touch sensing technology including other proximity sensor arrays or other elements, to detect a contact, a motion, and the interruption of the contact or motion. Also, the user interface 1120 may include at least one of a Liquid Crystal Display (LCD), a Light Emitting Diode (LED), a Light Emitting Polymer Display (LEPD), an Organic Light Emitting Diode (OLED), an Active Matrix Organic Light Emitting Diode (AMOLED), or a Flexible LED (FLED).

The storage unit 1130 may store at least one of software, micro-code, setting information, and the like. The storage unit 1130 may include at least one of a high-speed random access memory (RAM), a non-volatile memory, at least one optical storage device, and a flash memory. The storage unit 1130 may store various software constituent elements such as an operating system, etc. For example, the operating system may include an embedded operating system such as WINDOWS, LINUX, Darwin, RTXC, UNIX, OS X, VxWorks, Android, and iOS. Also, a module being a software constituent element may be expressed as a set of instructions, and the module may be denoted as an 'instruction set' or 'program'.

The control unit 1140 controls the general operation and function of the electronic device. For this, the control unit 1140 may include at least one processor. According to cases, the whole control unit 1140 may be denoted as a processor. The control unit 1140 may include at least one hardware chip. Also, the control unit 1140 executes software to enable the electronic device to perform a function implemented by the software. In accordance with an exemplary embodiment of the present disclosure, the control unit 1140 may include an image processing unit 1142 for generating and combining images having different noise characteristics. A function of the image processing unit 1142 may be implemented by software. In this case, the image processing unit 1142 may be omitted. An instruction set expressing the function of the image processing unit 1142 may be stored in the storage unit 1130. The instruction set may be executed by the control unit 1140. In accordance with various exemplary embodiments of the present disclosure, the control unit 1140 may control the electronic device to perform the procedures illustrated in FIG. 7, FIG. 8, and FIG. 10.

According to an exemplary embodiment of the present disclosure, if it is the low light, the control unit 1140 generates a plurality of images having different noise characteristics. In other words, the control unit 1140 generates two or three or more images having different SNRs. For example, the control unit 1140 may generate a first image and then, convert into a binning mode in order to generate a second image having more excellent noise characteristics than the first image. Or, the control unit 1140 may generate the first image, and downscale the first image to thereby generate the second image. At this time, the plurality of images may have resolutions different from one another. Thereafter, the control unit 1140 combines the images with one another. At this time, if resolutions of the images are different from one another, the control unit 1140 may upscale or downscale a part of the images, thereby making consistent the resolutions of the images. Also, in combining the images, the control unit 1140 may grant different weights to the images respectively. The control unit 1140 may equally apply the weights to the whole images, or apply in a pixel setup unit of a constant size, or apply in a pixel unit. The weights may be determined differently according to a concrete exemplary embodiment. For example, the weight may be determined based on a level of an edge existing in an image, and a level of a noise.

Figure 12:
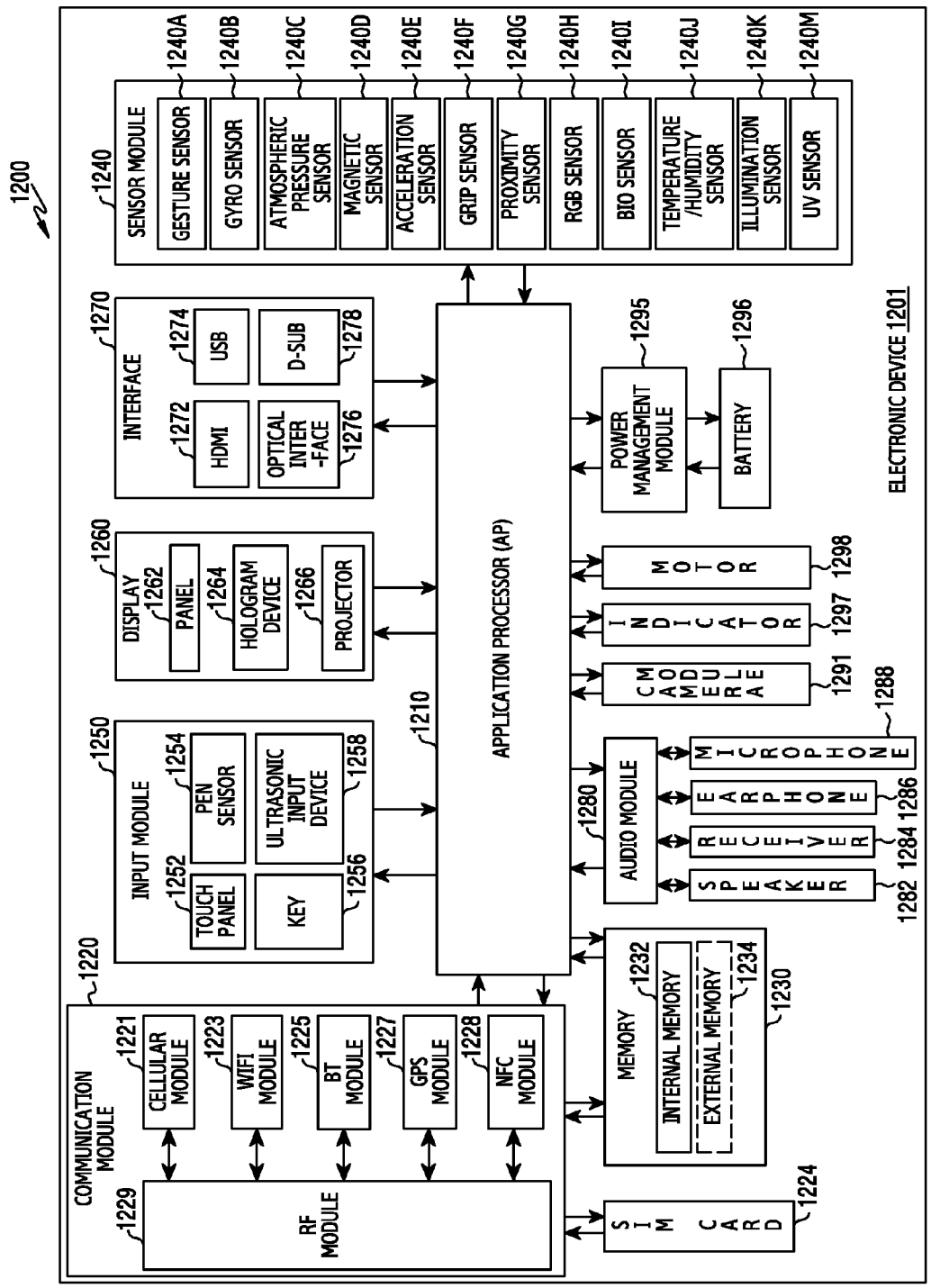
FIG. 12 illustrates a block diagram of an electronic device according to various exemplary embodiments.

FIG. 12 illustrates a block diagram of an electronic device 1200 according to various embodiments. The electronic device 1200 may constitute, for example, all or some of the electronic device 101 illustrated in FIG. 1. Referring to FIG. 12, the electronic device 1200 may include at least one of an Application Processor (AP) 1210, a communication module 1220, a Subscriber Identifier Module (SIM) card 1224, a memory 1230, a sensor module 1240, an input module 1250, a display 1260, an interface 1370, an audio module 1280, a camera module 1291, a power management module 1295, a battery 1296, an indicator 1297, and a motor 1298.

The AP 1210 may control a plurality of hardware or software components connected thereto by driving an operating system or an application program, process various types of data including multimedia data, and perform calculations. The AP 1210 may be implemented by, for example, a System on Chip (SoC). According to an embodiment, the AP 1210 may further include a Graphic Processing Unit (GPU) (not shown).

The communication module 1220 (e.g., the communication interface 120 of FIG. 1) may perform data transmission/reception in communication between the electronic device 1200 (e.g., the electronic device 101 of FIG. 1) and the second electronic devices (e.g., the electronic device 104 and the server 106) connected over a network. According to an embodiment, the communication module 1220 may include a cellular module 1221, a WiFi module 1223, a BT module 1225, a GPS module 1227, an NFC module 1228, and a Radio Frequency (RF) module 1229.

The cellular module 1221 may provide a voice call, a video call, a message service, or an internet service through a communication network (e.g., LTE, LTE-A, CDMA, WCDMA, UMTS, WiBro, GSM, or the like). Also, the cellular module 1221 may identify and authenticate the electronic device 1200 in a communication network using, for example, a subscriber identification module (e.g., the SIM card 1224). According to an embodiment, the cellular module 1221 may perform at least some of the functions that may be provided by the AP 1210. For example, the cellular module 1221 may perform at least some of the multimedia control functions.

According to an embodiment, the cellular module 1221 may include a Communication Processor (CP). In addition, the cellular module 1221 may be implemented by, for example, a System on Chip (SOC). Although the cellular module 1221 (e.g., a communication processor), the memory 1230, the power management module 1295, and the like are illustrated as components separated from the AP 1210, the AP 1210 may include at least some of the above-mentioned components (e.g., the cellular module 1221) according to an embodiment.

According to an embodiment, the AP 1210 or the cellular module 1221 (e.g., the communication processor) may load a command or data received from at least one of a non-volatile memory and other elements connected thereto into a volatile memory and process the loaded command or data. Furthermore, the AP 1210 or the cellular module 1221 may store, in a non-volatile memory, data received from or generated by at least one of the other components.

Each of the Wi-Fi module 1223, the BT module 1225, the GPS module 1227, or the NFC module 1228 may include, for example, a processor for processing data transmitted/received through the corresponding module. Although each of the cellular module 1221, the WiFi module 1223, the BT module 1225, the GPS module 1227, and the NFC module 1228 is illustrated as a separate block in FIG. 12, at least some (e.g., two or more) of the cellular module 1221, the WiFi module 1223, the BT module 1225, the GPS module 1227, and the NFC module 1228 may be included in one integrated chip (IC) or IC package according to an embodiment. For example, at least a few (e.g., a communication processor corresponding to the cellular module 1221 and a Wi-Fi processor corresponding to the Wi-Fi module 1223) of the processors corresponding to the cellular module 1221, the Wi-Fi module 1223, the BT module 1225, the GPS module 1227, and the NFC module 1228, respectively, may be implemented by a single SoC.

The RF module 1229 may transmit/receive data, for example, an RF signal. Although not illustrated, the RF module 1229 may include, for example, a transceiver, a Power Amp Module (PAM), a frequency filter, or a Low Noise Amplifier (LNA). Further, the RF module 1229 may further include a component for transmitting/receiving an electromagnetic wave in the air in radio communication, such as a conductor or a conducting wire. Although FIG. 12 illustrates that the cellular module 1221, the WiFi module 1223, the BT module 1225, the GPS module 1227, and the NFC module 1227 share one RF module 1229, at least one of the cellular module 1221, the WiFi module 1223, the BT module 1225, the GPS module 1227, and the NFC module 1228 may transmit/receive an RF signal through a separate RF module.

The SIM card 1224 may be a card including a subscriber identification module and may be inserted into a slot formed in a particular portion of the electronic device 1200. The SIM card 1224 may include unique identification information (e.g., Integrated Circuit Card IDentifier (ICCID)) or subscriber information (e.g., International Mobile Subscriber Identity (IMSI)).

The memory 1230 (e.g., the memory 130 of FIG. 1) may include an internal memory 1232 or an external memory 1234. The internal memory 1232 may include at least one of a volatile memory (e.g., a Dynamic Random Access Memory (DRAM), a Static Random Access Memory (SRAM), a Synchronous Dynamic Random Access Memory (SDRAM), and the like) and a non-volatile memory (e.g., a One Time Programmable Read Only Memory (OTPROM), a Programmable Read Only Memory (PROM), an Erasable and Programmable Read Only Memory (EPROM), an Electrically Erasable and Programmable Read Only Memory (EEPROM), a mask Read Only Memory, a flash Read Only Memory, a negative-AND (NAND) flash memory, a negative-OR (NOR) flash memory, and the like).

According to an embodiment, the internal memory 1232 may be a Solid State Drive (SSD). The external memory 1234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1234 may be functionally connected to the electronic device 1200 through various interfaces. According to an embodiment, the electronic device 1200 may further include a storage device (or storage medium) such as a hard drive.

The sensor module 1240 may measure a physical quantity or detect an operating state of the electronic device 1200 and convert the measured or detected information into an electrical signal. The sensor module 1240 may include, for example, at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., a Red, Green, Blue (RGB) sensor), a biometric sensor 12401, a temperature/humidity sensor 1240J, a light or illuminance sensor 1240K, and an ultraviolet (UV) sensor 1240M. Additionally or alternatively, the sensor module 1240 may include, for example, an E-nose sensor (not illustrated), an Electromyography (EMG) sensor (not illustrated), an Electroencephalogram (EEG) sensor (not illustrated), an Electrocardiogram (ECG) sensor (not illustrated), an Infrared (IR) sensor, an iris sensor (not illustrated), or a fingerprint sensor (not illustrated). The sensor module 1240 may further include a control circuit for controlling at least one sensor included therein.

The input device 1250 may include a touch panel 1252, a (digital) pen sensor 1254, a key 1256, or an ultrasonic input device 1258. The touch panel 1252 may recognize a touch input through at least one of, for example, a capacitive type, a resistive type, an infrared type, and an ultrasonic type. The touch panel 1252 may further include a control circuit. A capacitive type touch panel may recognize physical contact or proximity. The touch panel 1252 may further include a tactile layer. In this case, the touch panel 1252 may provide a tactile reaction to a user.

The (digital) pen sensor 1254 may be implemented, for example, using the same or similar method to receiving a user's touch input or using a separate recognition sheet. The key 1256 may include, for example, a physical button, an optical key or a keypad. The ultrasonic input device 1258 is a device which can detect an acoustic wave by a microphone (e.g., a microphone 1288) of the electronic device 1200 through an input tool generating an ultrasonic signal to identify data, and can perform wireless recognition. According to an embodiment, the electronic device 1200 may also receive a user input from a second electronic device (e.g., a computer or a server, e.g., the server 106 of FIG. 1) connected thereto by using the communication module 1220.

The display 1260 (e.g., the display 150 of FIG. 1) may include a panel 1262, a hologram device 1264, or a projector 1266. The panel 1262 may be, for example, a Liquid Crystal Display (LCD), Active-Matrix Organic Light Emitting Diode (AM-OLED), or the like. The panel 1262 may be implemented to be, for example, flexible, transparent, or wearable. The panel 1262 may also be configured as one module together with the touch panel 1252. The hologram device 1264 may show a stereoscopic image in the air using interference of light. The projector 1266 may project light onto a screen to display an image. For example, the screen may be located inside or outside the electronic device 1200. According to an embodiment, the display 1260 may further include a control circuit for controlling the panel 1262, the hologram unit 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) 1278. The interface 1270 may be included in, for example, the communication interface 120 illustrated in FIG. 1. Additionally or alternatively, the interface 1270 may include, for example, a Mobile High-definition Link (MHL) interface, a Secure Digital (SD) card/Multi-Media Card (MMC) interface, or an Infrared Data Association (IrDA) standard interface.

The audio module 1280 may bilaterally convert a sound and an electrical signal. At least some components of the audio module 1280 may be included in, for example, the input/output interface 140 illustrated in FIG. 1. The audio module 1280 may process voice information input or output through, for example, a speaker 1282, a receiver 1284, earphones 1286, or the microphone 1288.

The camera module 1291 is a device that may photograph still and moving images, and according to an embodiment, may include one or more image sensors (e.g., a front sensor or a rear sensor), a lens (not shown), an Image Signal Processor (ISP) (not shown), or a flash (e.g., an LED or a xenon lamp, not shown).

The power management module 1295 may manage electric power of the electronic device 1200. Although not illustrated, the power management module 1295 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and may prevent an overvoltage or excess current from being induced or flowing from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, the remaining amount of battery, a charging voltage and current, or temperature. The battery 1296 may store or generate electricity and supply power to the electronic device 1200 using the stored or generated electricity. The battery 1296 may include, for example, a rechargeable battery or a solar battery.

The indicator 1297 may display a particular state of the electronic device 1200 or a part thereof (e.g., the AP 1210), for example, a boot-up state, a message state, a charging state, or the like. The motor 1298 may convert an electrical signal into mechanical vibration. Although not illustrated, the electronic device 1200 may include a processing unit (e.g., a GPU) for supporting mobile TV. The processing device for supporting mobile TV may process media data according to standards such as, for example, a digital multimedia broadcasting (DMB), a digital video broadcasting (DVB) or a media flow.

Each of the above described elements of the electronic device 101, or 1200, according to various embodiments of the present disclosure may be formed of one or more components, and the name of a corresponding element may vary according to the type of the electronic device 101, or 1200. The electronic device 101, or 1200, according to various embodiments of the present disclosure may include at least one of the above described elements and may exclude some of the elements or further include other additional elements. Further, some of the elements of the electronic device 101, or 1200, according to various embodiments of the present disclosure may be coupled to form a single entity while performing the same functions as those of the corresponding elements before the coupling.

At least some of the devices (e.g., modules or functions thereof) or methods (e.g., operations) according to various embodiments of the present disclosure may be implemented by, for example, by a command stored in a computer-readable storage medium in the form of a programming module. When the command is executed by one or more processors (e.g., the processor 120), the one or more processors may execute a function corresponding to the command. The computer-readable storage medium may be, for example, the memory 130. At least some of the programming modules may be implemented (e.g., executed) by, for example, the processor 120. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

The above-described components of the electronic device 101, or 1200, according to the present disclosure may each be configured with one or more components, and names of the components may vary according to the type of the electronic device 101, or 1200. The electronic device 101, or 1200, according to the present disclosure may include at least one of the above-described components, some of which can be omitted, or may further include other additional components. In addition, some of the components of the electronic device 101, or 1200, according to the present disclosure are configured as one entity by being combined with one another, so the functions of the components, which are defined before the combination, may be performed in the same manner.

The term "module" used in the various embodiments of the present disclosure may refer to, for example, a unit including one or more combinations of hardware, software, and firmware. The "module" may be interchangeable with a term, such as a unit, logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

According to various embodiments, a storage medium storing commands is provided. The commands are configured to allow one or more processors to execute one or more operations when the commands are executed by the one or more processors. The one or more operations may include: configuring one or more categories in a hierarchical structure; mapping one or more contents and the one or more categories based on at least one piece of information on the one or more contents and information on the categories; and when content-related information of each category determined according to the mapping meets a preset condition, updating the hierarchical structure of the categories based on the preset condition.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one image sensor; and
   a processor configured to
      obtain, from the at least one image sensor, a plurality of images comprising a first image having a first noise, and a second image having a second noise;
      grant a first weight to the first image and a second weight to the second image; and
      combine, based on the first weight and the second weight, the first image and the second image to provide an output image,
   wherein, if the first noise is equal to or greater than a threshold value and the second noise is less than the threshold value, the second weight is granted higher than the first weight.

2. The electronic device of claim 1, wherein the plurality of images have different resolutions.

3. The electronic device of claim 1, wherein a plurality of images comprise a first image having a first resolution, the second image having a second resolution acquired in a binning technique, and a third image generated by downscaling the first image.

4. The electronic device of claim 3, wherein the first image is any one of an image outputted from the at least one image sensor before acquiring the second image and an image photographed after acquiring the second image.

5. The electronic device of claim 1, wherein the processor is configured to make consistent resolutions of the plurality of images by upscaling at least one image having a relatively lower resolution, and combines the images.

6. The electronic device of claim 1, wherein the processor is configured to grant different weights to the plurality of images respectively.

7. The electronic device of claim 6, wherein the weights are determined based on at least one of: lights of the images, levels of edges existing in the images, and levels of noises of the images.

8. The electronic device of claim 6, wherein, if a parameter indicating levels of edges existing in the images is equal to or is greater than a threshold value, the processor applies a relatively higher weight to an image of a relatively higher resolution.

9. The electronic device of claim 1, wherein the processor is configured to divide the plurality of images into a plurality of areas, and grants different weights to the areas by image respectively.

10. The electronic device of claim 1, wherein the processor is configured to determine whether to combine the plurality of images, based on at least one of whether it is a low-light environment or not, whether an exposure time is increased, and whether a sensor gain is increased.

11. An operation method of an electronic device, the method comprising:
   obtaining, from the at least one image sensor, a plurality of images comprising a first image having a first noise, and a second image having a second noise;
   granting a first weight to the first image and a second weight to the second image; and
   combining, based on the first weight and the second weight, the first image and the second image to provide an output image, wherein, if the first noise is equal to or greater than a threshold value and the second noise is less than the threshold value, the second weight is granted higher than the first weight.

12. The method of claim 11, wherein the plurality of images have different resolutions.

13. The method of claim 11, wherein a plurality of images comprise a first image having a first resolution, the second image having a second resolution acquired in a binning technique and a third image generated by downscaling the first image.

14. The method of claim 13, wherein the first image is any one of an image outputted from an image sensor before acquiring the second image and an image photographed after acquiring the second image.

15. The method of claim 11, further comprising combining the plurality of images comprises making consistent resolutions of the plurality of images by upscaling at least one image having a relatively lower resolution.

16. The method of claim 15, wherein the combining of the plurality of images comprises granting different weights to the images respectively.

17. The method of claim 16, wherein the different weights are determined based on at least one of lights of the images, levels of edges existing in the images, and levels of noises of the images.

18. The method of claim 16, wherein the granting of the different weights comprises applying a relatively higher weight to an image of a relatively higher resolution, if a parameter indicating levels of edges existing in the images is equal to or is greater than a threshold value.

19. The method of claim 15, wherein the combining of the images comprises dividing the images into a plurality of areas, and granting different weights to the areas by image respectively.

20. The method of claim 11, further comprising determining whether to combine the plurality of images, based on at least one of whether it is a low-light environment or not, whether an exposure time is increased, and whether a sensor gain is increased.

* * * * *